(12) United States Patent
Zhang et al.

(10) Patent No.: US 10,619,910 B2
(45) Date of Patent: Apr. 14, 2020

(54) REFRIGERATOR AND MANUFACTURING METHOD THEREOF

(71) Applicant: QINGDAO HAIER JOINT STOCK CO., LTD., Quingdao, Shandong Province (CN)

(72) Inventors: Hao Zhang, Qingdao (CN); Enpin Xia, Qingdao (CN); Guoshun He, Qingdao (CN); Xiaobing Zhu, Qingdao (CN)

(73) Assignee: QINGDAO HAIER JOINT STOCK CO., LTD., Qingdao, Shandong Province (CN)

( * ) Notice: Subject to any disclaimer, the term of this patent is extended or adjusted under 35 U.S.C. 154(b) by 0 days.

(21) Appl. No.: 16/300,548

(22) PCT Filed: Dec. 29, 2016

(86) PCT No.: PCT/CN2016/112822
§ 371 (c)(1),
(2) Date: Nov. 9, 2018

(87) PCT Pub. No.: WO2017/197890
PCT Pub. Date: Nov. 23, 2017

(65) Prior Publication Data
US 2019/0285334 A1    Sep. 19, 2019

(30) Foreign Application Priority Data
May 20, 2016 (CN) .......................... 2016 1 0344072

(51) Int. Cl.
*F25D 23/02* (2006.01)
*B23K 26/382* (2014.01)
(Continued)

(52) U.S. Cl.
CPC ............ *F25D 23/02* (2013.01); *B21D 28/34* (2013.01); *B23K 26/382* (2015.10);
(Continued)

(58) Field of Classification Search
CPC .... F25D 23/02; F25D 29/005; F25D 2400/36; F25D 27/005; B23K 26/382; B21D 28/34
See application file for complete search history.

(56) References Cited

U.S. PATENT DOCUMENTS 8,922,979 B2 * 12/2014 Fluhrer ................ H03K 17/964
 361/679.01
9,528,748 B2 * 12/2016 Joo .......................... F25D 23/02
(Continued)

FOREIGN PATENT DOCUMENTS

CN       1862097 A    11/2006
CN     201725513 U     1/2011
(Continued)

*Primary Examiner* — Hanh V Tran
(74) *Attorney, Agent, or Firm* — Cheng-Ju Chiang

(57) ABSTRACT

The present invention provides a refrigerator and a manufacturing method thereof. The refrigerator comprises: a refrigerator body, and at least one door body configured to close the refrigerator body. The at least one door body comprises a front panel, a rear panel, and side panels respectively connected to the front panel and the rear panel to form a foaming space. The front panel is made of a metal material, and is provided with a plurality of irregular run-through accommodating holes, each of which is in a predetermined shape. The at least one door body further comprises a display unit arranged in the foaming space and partially embedded in the accommodating holes, and a control unit configured to control the display unit to be in a light-emitting state or a normal display state.

8 Claims, 4 Drawing Sheets

(51) Int. Cl.
    *B21D 28/34*    (2006.01)
    *F25D 29/00*    (2006.01)
    *F25D 27/00*    (2006.01)
(52) U.S. Cl.
    CPC .......... *F25D 29/005* (2013.01); *F25D 27/005*
        (2013.01); *F25D 2400/36* (2013.01)

(56) References Cited

U.S. PATENT DOCUMENTS

| | | | | |
|---|---|---|---|---|
| 10,007,385 B2* | 6/2018 | Kim | ........................ | G06F 3/044 |
| 10,012,426 B2* | 7/2018 | Joo | ........................ | F25D 11/02 |
| 10,054,361 B2* | 8/2018 | Kim | .................... | A47L 15/4293 |
| 10,055,038 B2* | 8/2018 | Park | ........................ | G06F 3/041 |
| 2012/0038258 A1* | 2/2012 | Park | ..................... | E05D 7/0027 |
| | | | | 312/405 |
| 2012/0286638 A1* | 11/2012 | Lee | ........................ | F25D 23/02 |
| | | | | 312/405 |
| 2013/0082948 A1* | 4/2013 | Ok | .......................... | F25D 29/00 |
| | | | | 345/173 |
| 2016/0003519 A1* | 1/2016 | Kim | ..................... | F25D 29/005 |
| | | | | 362/307 |
| 2016/0117022 A1* | 4/2016 | Kim | ........................ | G06F 3/044 |
| | | | | 345/174 |
| 2016/0131420 A1* | 5/2016 | Park | ..................... | F25D 29/005 |
| | | | | 62/56 |
| 2016/0188093 A1* | 6/2016 | Kim | ...................... | F25D 29/005 |
| 2016/0341468 A1* | 11/2016 | Joo | ........................ | F25D 11/02 |
| 2017/0089633 A1* | 3/2017 | Kim | .................... | A47L 15/4293 |
| 2018/0274846 A1* | 9/2018 | Kim | ...................... | F25D 23/028 |
| 2018/0274848 A1* | 9/2018 | Kim | ...................... | F25D 23/028 |
| 2018/0373375 A1* | 12/2018 | Park | ..................... | G06F 3/0414 |
| 2019/0086141 A1* | 3/2019 | Kim | ........................ | B21D 5/00 |
| 2019/0178570 A1* | 6/2019 | Remmel | ............... | F25D 29/005 |

FOREIGN PATENT DOCUMENTS

| | | |
|---|---|---|
| CN | 202258148 U | 5/2012 |
| CN | 105051474 A | 11/2015 |
| CN | 105546930 A | 5/2016 |
| CN | 105588400 A | 5/2016 |
| CN | 106016889 A | 10/2016 |
| EP | 2375204 B1 | 10/2015 |
| KR | 10-2011-0101439 A | 9/2011 |

* cited by examiner

REFRIGERATOR AND MANUFACTURING METHOD THEREOF

CROSS REFERENCE OF THE RELATED APPLICATIONS

The present application is a 35 U.S.C. § 371 National Phase conversion of International (PCT) Patent Application No. PCT/CN2016/112822, filed on Dec. 29, 2016, which claims the priority of the Chinese patent application No. 201610344072.7 filed on May 20, 2016 and with the title of "Refrigerator and Manufacturing Method Thereof", which is incorporated herein in its entirety as reference. The PCT International Patent Application was filed and published in Chinese.

TECHNICAL FIELD

The present invention relates to the field of household appliances, and more particularly, to a refrigerator and a manufacturing method thereof.

BACKGROUND

As a common household appliance, a refrigerator can store fresh food through a storage chamber for storing food and a cold air supply unit for supplying cold air to the storage chamber. The storage chamber is opened or closed through a door body. A display unit is arranged on the door for displaying operation information of the refrigerator. Or an operation instruction is input into the display unit to control the refrigerator.

A traditional refrigerator door body is usually made of transparent glass for conveniently displaying the operation information of the refrigerator. With the development of technology, a metal door body is gradually adopted on the refrigerator to improve the user experience. However, the glass facade display technology cannot be applied to this metal door body.

Correspondingly, in order to solve the display problem of the metal door body, a plurality of regular-shaped through holes is formed in the metal door body to form a display area. Furthermore, a display unit is arranged behind the display area. After the display unit is started, operation information can be displayed through the regular-shaped through holes.

In this display mode, the regular-shaped through holes are formed in a front panel of the refrigerator through the sheet metal micro-pore technology. As the size of the holes is small, the process is complicated, resulting in excessive cost. In addition, in order to display the operation information of the refrigerator and to prevent dust from entering the interior of the refrigerator, usually, the regular-shaped through holes need to be filled with a light-transmissive material. Thus, when the display unit of the refrigerator is in a closed state, a user will see several small holes on the surface of the refrigerator as the through holes are filled with the light-transmissive material. As a result, the visual experience of the user is poor.

SUMMARY

An object of the present invention is to provide a refrigerator and a manufacturing method thereof.

In order to achieve one of the above objects, an embodiment of the present invention provides a refrigerator, comprising: a refrigerator body, and at least one door body configured to close the refrigerator body, wherein the at least one door body comprises: a front panel, a rear panel, and side panels respectively connected to the front panel and the rear panel to form a foaming space, the front panel being made of a metal material and provided with a plurality of irregular run-through accommodating holes, each of which is in a predetermined shape; a display unit arranged in the foaming space and partially embedded in the accommodating holes; and a control unit configured to control the display unit to be in a light-emitting state or a normal display state.

As an improvement of the embodiment of the present invention, areas of the plurality of irregular accommodating holes are between 2 $mm^2$ and 100 $mm^2$.

As a further improvement of the embodiment of the present invention, the predetermined shape belongs to at least one of a pattern, a character and a number.

Among the plurality of accommodating holes, the areas of 10% or less of the accommodating holes are 2-7 $mm^2$; the areas of at least 50% of the accommodating holes are 7-60 $mm^2$; and the areas of the remaining accommodating holes are 60-100 $mm^2$.

As a further improvement of the embodiment of the present invention, the front panel is arc-shaped, and the arc radius is 3,000-6,000 mm.

As a further improvement of the embodiment of the present invention, the refrigerator comprises a light-transmissive plate embedded in the accommodating holes, and an LED light guide plate corresponding to the light-transmissive plate and configured to provide a light source to the display unit.

The light-transmissive plate is made of a light-transmissive material; a front surface of the light-transmissive plate away from the rear panel smoothly transitions with a front surface of the front panel; and the front surface of the light-transmissive plate and the front surface of the front panel have the same color.

As a further improvement of the embodiment of the present invention, the light-transmissive plate comprises a light-transmissive portion which is embedded in and completely matched with the accommodating holes, and a first fixing member integrally formed with the light-transmissive portion and configured to detachably connect the display unit and the front panel.

As a further improvement of the embodiment of the present invention, the LED light guide plate comprises: a second fixing member for fixing the LED light guide plate in the foaming space, and a plurality of LED light sources embedded in a second light guide portion.

As a further improvement of the embodiment of the present invention, the door body further comprises: a rear baffle plate arranged in the foaming space; and the rear baffle plate, the front panel and the side panels form a closed space in which the light-transmissive portion is arranged.

As a further improvement of the embodiment of the present invention, the light-transmissive portion further comprises a guide plate which is arranged on the rear baffle plate and which is configured to fix the light-transmissive portion in the closed space.

In order to achieve one of the above objects, an embodiment of the present invention provides a manufacturing method of the above refrigerator. The method comprises: forming the plurality of irregular accommodating holes by die punching or laser cutting.

Compared with the prior art, the present invention has the following technical effects. According to the refrigerator and the manufacturing method thereof provided by the present invention, the irregular-shaped accommodating holes are formed in the front panel of the door body of the refrigerator through the die punching or laser cutting technology to display operating information of the refrigerator on the front panel of the refrigerator. With this cutting manner, the overall processing method is simple, so that batch processing is facilitated, thereby greatly saving cost. Further, as the light-transmissive plate having the same color as the front panel of the refrigerator is selected to fill the accommodating holes, the overall appearance beauty of the door surface of the refrigerator is enhanced when the refrigerator is in a dormant state. Therefore, the user experience is improved.

DETAILED DESCRIPTION

The present invention will be described in detail below with reference to specific embodiments shown in the accompanying drawings. However, these embodiments are not intended to limit the present invention, and changes of structures, methods or functions, made by ordinary person skilled in the art in accordance with these embodiments are included within the protective scope of the present invention.

Figure 1:
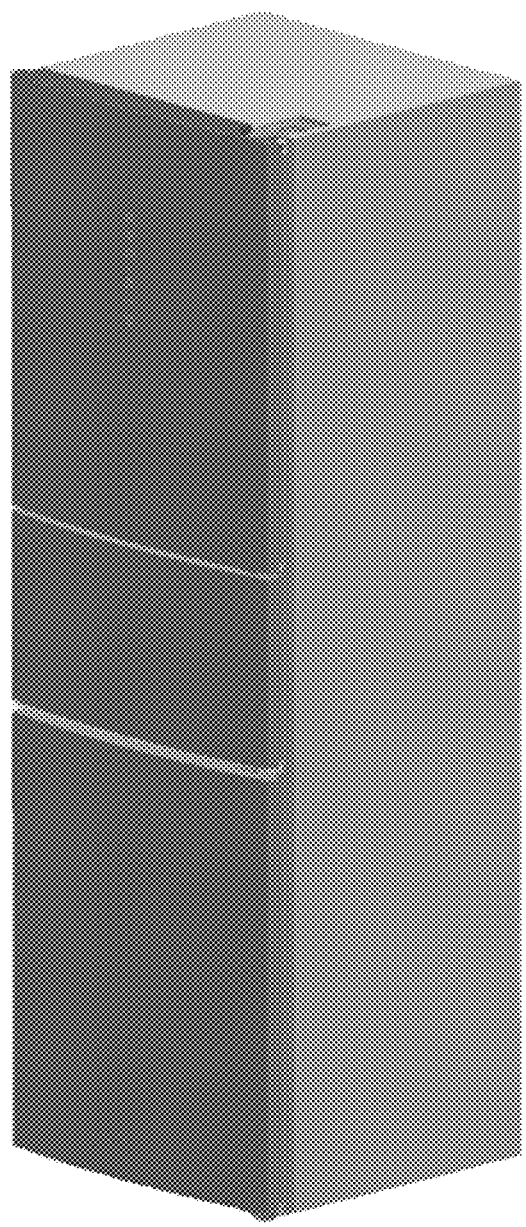
FIG. 1 shows a schematically structural view of a refrigerator according to an embodiment of the present invention.
Figure 2:
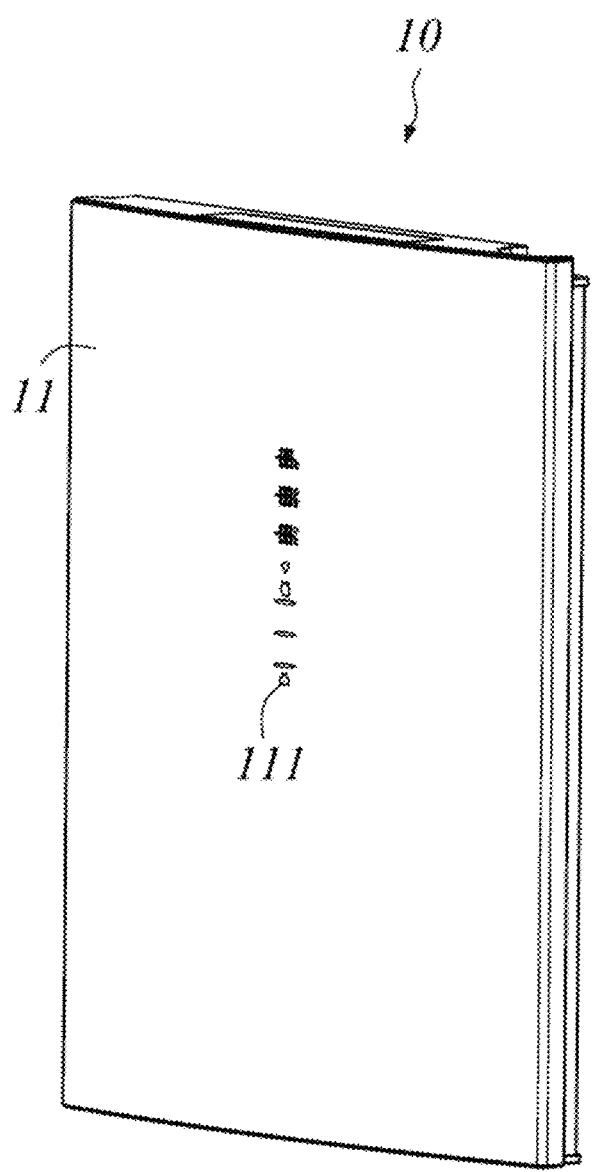
FIG. 2 shows a specifically structural view of a door body shown in FIG. 1.
Figure 3:
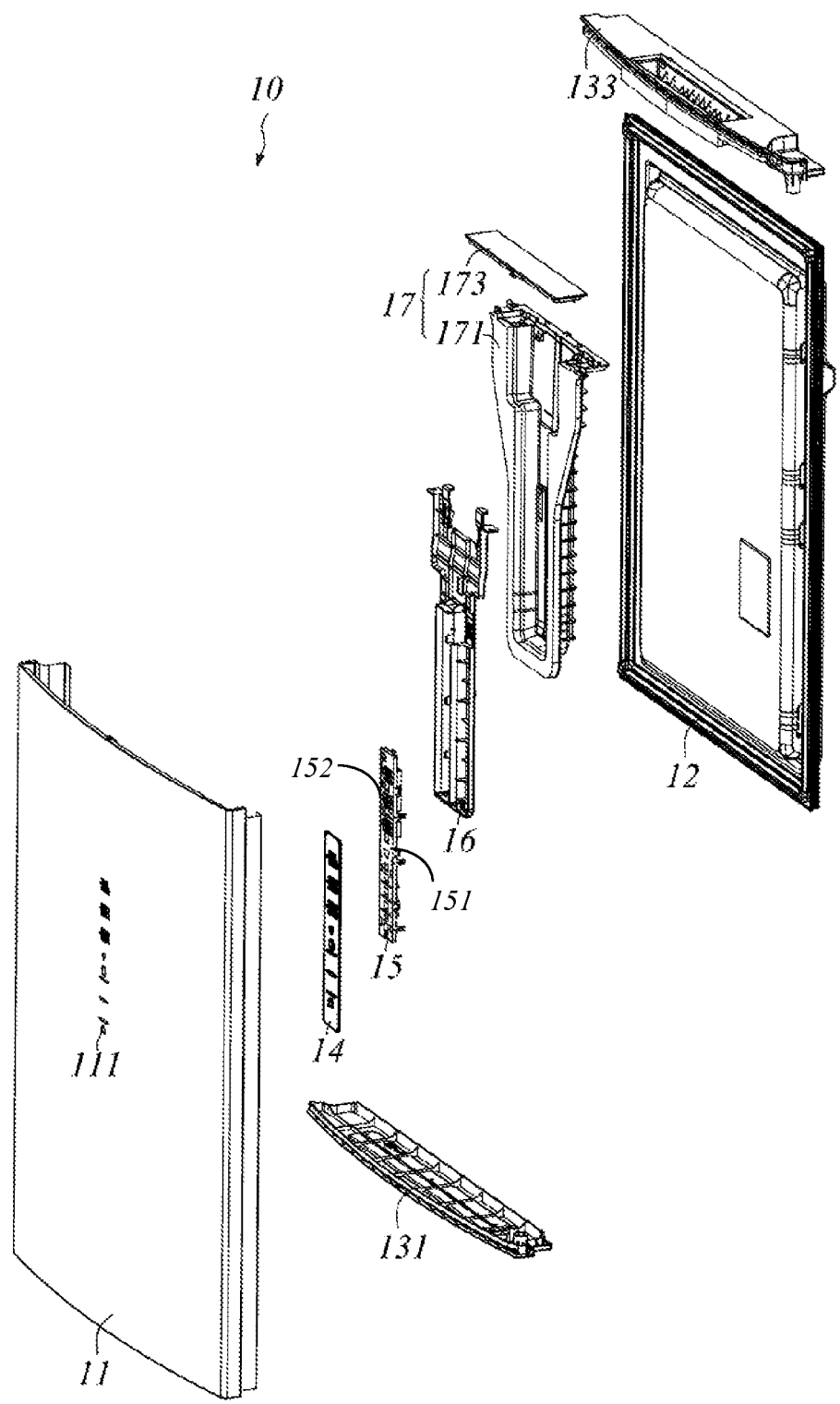
FIG. 3 is a schematically exploded view of the structure shown in FIG. 2.
Figure 4:
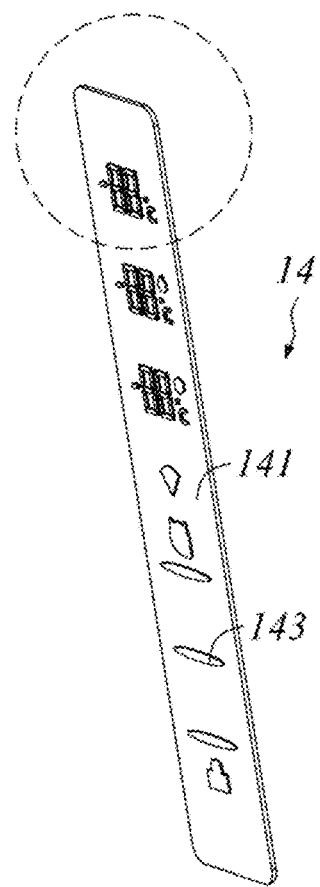
FIG. 4 is a schematically structural view of a light-transmissive plate shown in FIG. 3.
Figure 5:
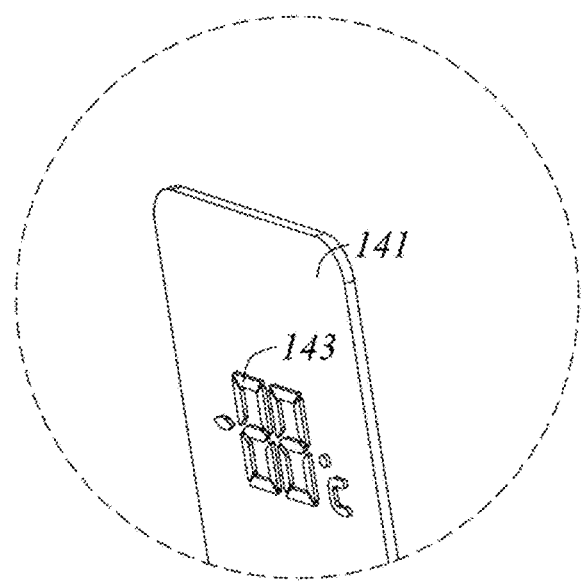
FIG. 5 is a schematic view of an enlarged structure of the circled portion shown in FIG. 4.

Please refer to FIGS. 1-5. The present invention provides a refrigerator 100, comprising: a refrigerator body (not specifically illustrated), and at least one door body 10 configured to close the refrigerator body. The at least one door body 10 comprises a front panel 11, a rear panel 12, and side panels (not specifically shown) respectively connected to the front panel 11 and the rear panel 12 to form a foaming space. The front panel 11 is made of a metal material, and is provided with a plurality of irregular run-through accommodating holes 111, each of which is in a predetermined shape. The at least one door body 10 further comprises a display unit (not specifically illustrated) arranged in the foaming space and partially embedded in the accommodating holes 111, and a control unit (not specifically illustrated) configured to control the display unit to be in a light-emitting state or a normal display state.

Of course, in practical applications, the foaming space needs to be filled with a heat-insulating filler (not specifically illustrated) to insulate the refrigerator body against heat, which will not be described in detail herein.

In a specific embodiment of the present invention, the predetermined shape belongs to at least one of a pattern, a character and a number. In general, a state and a temperature of the refrigerator 100 and information of goods stored in the refrigerator 100 need to be displayed on the door body 10. Thus, the predetermined shape formed by the accommodating hole 111 is generally a combination of a pattern, a character and a number, which will not be described in detail herein.

In a specific example of the present invention, the size of the plurality of accommodating holes 111 is specifically set according to a predetermined shape. In a preferred embodiment of the present invention, the areas of the accommodating holes 111 are 2-100 mm$^2$. In general, among the plurality of accommodating holes 111, the areas of at least 50% of the accommodating holes 111 are 7-60 mm$^2$. For example, these holes are in the shape of a number, or a character. The areas of 10% or less of the accommodating holes 111 are 2-7 mm$^2$. For example, these holes are in the shape "° C." representing the symbol of a degree Celsius in the refrigerator 100. The areas of the remaining accommodating holes 111 are 60-100 mm$^2$. For example, these holes are in the shapes of graphic marks. Of course, the area sizes of the above-mentioned accommodating holes 111 are only described illustratively in a specific example of the present invention, and are not intended to limit the present invention, which will not be described in detail herein.

As described above, the plurality of the accommodating holes 111 in the present invention can be obtained through die punching or laser cutting, so that the manufacturing cost is lower, and the use cost of a user is reduced accordingly.

In order to improve the texture of the refrigerator 100, the front panel 11 is made of a metal material. The commonly-used metal materials include aluminum, an aluminum alloy, stainless steel, copper, a copper alloy, etc. Generally, the thickness of the front panel 11 is 0.5-1 mm. For improving the appearance beauty of the refrigerator 100, the front panel 11 of the refrigerator 100 can also be sprayed with different colors to meet needs of users, which will not be described in detail herein.

In a preferred embodiment of the present invention, the front panel 11 is arc-shaped, and the arc radius is 3,000-6,000 mm.

The rear panel 12 is close to the body of the refrigerator 100. The shape of the rear panel can be specifically set according to requirements. The side panels are specifically arranged according to the shapes of the front panel 11 and the rear panel 12, and are configured to form a closed space with the front panel 11 and the rear panel 12. The side panels, the front panel 11 and the rear panel 12 can be fixed through gluing, clamping, threading or other structures. In a preferred embodiment of the present invention, the side panels, the front panel 11 and the rear panel 12 are cooperatively fixed through gluing and a plug-in structure, so that the disassembling and adjustment are convenient, which will not be described in detail herein.

In a specific example of the present invention, each side panel comprises an upper lining plate 131 and a lower lining plate 133 to facilitate assembling of the door body 10.

In a preferred embodiment of the present invention, the display unit comprises: a light-transmissive plate 14 embedded in the accommodating holes 111, and an LED light guide plate 15 corresponding to the light-transmissive plate 14 and configured to provide a light source to the display unit.

The front surface of the light-transmissive plate 14 away from the rear panel 12 smoothly transitions with the front surface of the front panel 11; and the front surface of the light-transmissive plate 14 and the front surface of the front panel 11 have the same color. Thus, when the display unit is in a closed state, from the view of the user, there is no color difference on the appearance of the refrigerator 100 as the plurality of irregular-shaped accommodating holes 111 formed in the front panel 11 are filled with the light-transmissive plate 14 which has the same color as the front panel 11. Therefore, the overall appearance beauty of the front panel 11 is improved.

The light-transmissive plate 14 is made of a light-transmissive material, for example, a resin with metallic luster. Usually, the surface of the resin is provided with a film obtained by the nano-layering technology, so that the resin actually containing no metal also shows the texture of metal. The light transmittance of the light-transmissive plate 14 may be specifically set according to requirements. In a preferred embodiment of the present invention, the light transmittance of the light-transmissive plate 14 is 30% to 60%. Thus, when the refrigerator 100 is in an operating state, the operating parameters of the refrigerator 100 may be displayed on the front panel 11 of the refrigerator 100 through a light-transmissive portion 143 so as to provide information to a user, which will not be described in detail herein.

The light-transmissive plate 14 comprises a light-transmissive portion 143 which is embedded in and completely matched with the accommodating holes 111, and a first fixing member 141 integrally formed with the light-transmissive portion 143 and configured to detachably connect the display unit and the front panel 11.

The light-transmissive portion 143 is a protrusion which is formed on a first fixing member 141 and which has the same shape as the predetermined shape formed by the plurality of different shapes of the accommodating holes 111. The height of the protrusion is greater than or equal to the thickness of the front panel 11. In a preferred embodiment of the present invention, the height of the protrusion is equal to the thickness of the front panel 11. The first fixing member 141 and the front panel 11 may be glued, or may be fixed through a threaded nut or the like. Through this manner, the light-transmissive portion 143 is directly embedded in the accommodating holes 111 through the first fixing member 141, so that the assembling and disassembling are easy, and the display effect is better.

In other embodiments of the present invention, the whole light-transmissive plate 14 may be made of a light-transmissive material. The light-transmissive portion 143 is exposed on the outer surface of the accommodating holes 111, and is provided with a light-transmissive film having the same color as the front panel 11 and made of the same light-transmissive material, which will not be described in detail herein.

The LED light guide plate 15 comprises a second fixing member 151 for fixing the LED light guide plate 15 in the foaming space, and a plurality of LED light sources 152 embedded in the second fixing member 151. In this way, the LED light sources are embedded in the second fixing member 151, so that the second fixing member 151 can also be configured to amplify the light sources and can prevent the light from being scattered. The first fixing member 141 may be made of PE. In addition, when the LED light sources are selectively turned on or turned off according to an operating state of the refrigerator 100, the light-transmissive portion 143 can selectively display the operating parameters of the refrigerator 100 on the front panel 11 of the refrigerator 100 to provide information to the user, which will not be described in detail herein.

It should be understood that, the protrusion corresponding to each light-transmissive plate 14 is provided with a corresponding LED light source. Meanwhile, the number of the LED light sources will also be specifically adjusted in accordance with the size of the protrusion, which will not be described in detail herein.

In this embodiment, the second fixing member 151 can be fixed on the first fixing member 141 through gluing, clamping, threading or other structures, so as to conveniently fix the LED light source and the light-transmissive plate 14 at corresponding positions, which will not be described in detail herein.

In a preferred embodiment of the present invention, the door body 10 further comprises a rear baffle plate 17 arranged in the foaming space. The rear baffle plate 17, the front panel 11 and the side panels form a closed space in which the light-transmissive portion 143 is arranged. In this way, when the foaming space of the refrigerator forms, the influence of the heat-insulating filler on the light-transmissive portion 143 can be avoided.

In a specific example of the present invention, the rear baffle plate 17 comprises a rear baffle plate main body 171, and an upper cover plate 173 which cooperates with the rear baffle plate body 171 and forms a closed space with the front panel 11 and the side panels.

A through hole (not specifically illustrated) is formed in one side of the rear baffle plate main body 171. The upper cover plate 173 is configured to close the through hole. The upper cover plate 173 and the rear baffle plate main body 171 can be fixed through gluing, clamping, threading or other structures, which will not be described in detail herein. In an assembling process of the door body 10, the position of the light-transmissive portion 143 in the closed space can be finely adjusted through the through hole. Then, the upper cover plate 173 covers the rear baffle plate main body 171. Through this manner, the mounting and adjustment of the door body 10 are facilitated.

Of course, in other embodiments of the present invention, the through hole and the upper cover plate 173 which are matched with each other on the rear baffle plate 17 may be omitted. In the assembling process, the rear baffle plate 17 is arranged in the foaming space after the assembling of all components in the closed space is completed, which will not be described in detail herein.

In a preferred embodiment of the present invention, the light-transmissive portion 143 further comprises a guide plate 16 arranged on the rear baffle plate 17 for fixing the LED light guide plate 15 into the closed space. Similarly, the guide plate 16 may be fixed on the rear baffle plate 17 through gluing, clamping, threading or other structures, which will not be described in detail herein. In this embodiment, the second fixing member 151 can be fixed in the closed space only through the guide plate 16, which will not be described in detail herein.

In summary, according to the refrigerator and the manufacturing method thereof provided by the present invention, the irregular-shaped accommodating holes are formed in the front panel of the door body of the refrigerator through the die punching or laser cutting technology to display operating information of the refrigerator on the front panel of the refrigerator. With this cutting manner, the overall processing method is simple, so that batch processing is facilitated, thereby greatly saving cost. Further, as the light-transmissive plate having the same color as the front panel of the refrigerator is selected to fill the accommodating holes, the overall appearance beauty of the door surface of the refrigerator is enhanced when the refrigerator is in a dormant state. Therefore, the user experience is improved.

Of course, the door body provided by the present invention may also be applied to other household appliances, for example, an air conditioner front panel, which will not be described in detail herein.

It should be understood that although the description is described based on the embodiments, not every embodiment includes only one independent technical solution. This statement of the description is only for clarity. Those skilled in the art should treat the description as a whole, and technical solutions in all of the embodiments may also be properly combined to form other embodiments that will be understood by those skilled in the art.

The above detailed description only aims to specifically illustrate the available embodiments of the present invention, and is not intended to limit the protection scope of the present invention. Equivalent embodiments or modifications thereof made without departing from the spirit of the present invention shall fall within the protection scope of the present invention.

What is claimed is:

1. A refrigerator, comprising: a refrigerator body, and at least one door body configured to close the refrigerator body, wherein:

the at least one door body comprises:

a front panel, a rear panel, and side panels respectively connected to the front panel and the rear panel to form a foaming space, the front panel being made of a metal material and provided with a plurality of irregular run-through accommodating holes, each of which is in a predetermined shape; and a display unit arranged in the foaming space and partially embedded in the accommodating holes;

wherein the display unit comprises: a light-transmissive plate to have portions thereof embedded in the accommodating holes, and an LED light guide plate corresponding to the light-transmissive plate and configured to provide an LED light source to the display unit, the LED light sources are selectively turned on or turned off according to an operating state of the refrigerator;

the light-transmissive plate is made of a light-transmissive material; a front surface of the light-transmissive plate away from the rear panel smoothly transitions with a front surface of the front panel;

the light-transmissive plate comprises a light-transmissive portion which is embedded in and completely matched with the accommodating holes, and a first fixing member integrally formed with the light-transmissive portion and configured to detachably connect to the front panel, the light-transmissive portion is configured as a protrusion which has the same shape as the predetermined shape formed by the plurality of different shapes of the accommodating holes;

the light-transmissive portion is exposed on the outer surface of the accommodating holes, and is provided with a light-transmissive film having the same color as the front panel.

2. The refrigerator of claim 1, wherein areas of the plurality of irregular accommodating holes are between 2 $mm^2$ and 100 $mm^2$.

3. The refrigerator of claim 1, wherein the predetermined shape belongs to at least one of a pattern, a character and a number; among the plurality of accommodating holes, the areas of 10% or less of the accommodating holes are 2-7 $mm^2$; the areas of at least 50% of the accommodating holes are 7-60 $mm^2$; and the areas of the remaining accommodating holes are 60-100 $mm^2$.

4. The refrigerator of claim 1, wherein the front panel is arc-shaped, and the arc radius is 3,000-6,000 mm.

5. The refrigerator of claim 1, wherein the LED light guide plate comprises: a second fixing member for fixing the LED light guide plate in the foaming space, and a plurality of LED light sources embedded in the second fixing member.

6. The refrigerator of claim 5, wherein the door body further comprises: a rear baffle plate arranged in the foaming space; and the rear baffle plate, the front panel and the side panels form a closed space in which the light-transmissive portion is arranged.

7. The refrigerator of claim 6, wherein the door body further comprises a guide plate which is arranged on the rear baffle plate and which is configured to fix the light-transmissive portion in the closed space.

8. A manufacturing method of the refrigerator of claim 1, wherein the method comprises: forming the plurality of irregular accommodating holes in the front panel of the door body by die punching or laser cutting.

* * * * *